United States Patent [19]

Garcelon

[11] 4,303,437
[45] Dec. 1, 1981

[54] PROCESS FOR THE ADJUSTMENT OF THE GLASS TEMPERATURE IN A FLOAT GLASS LEHR AND FLOAT GLASS LEHR IN ORDER TO BRING THIS PROCESS INTO OPERATION

[75] Inventor: Jean P. Garcelon, Paris, France

[73] Assignee: Stein Surface, Ris Orangis, France

[21] Appl. No.: 150,238

[22] Filed: May 15, 1980

[30] Foreign Application Priority Data

May 16, 1979 [FR] France .............................. 79 13281

[51] Int. Cl.³ .............................................. C03B 25/04
[52] U.S. Cl. ..................................... 65/99 A; 65/118;
    65/182.3; 65/182.4; 65/350; 432/11; 432/31
[58] Field of Search ................. 65/99 A, 182.3, 182.4,
    65/118, 350; 432/11, 31

[56] References Cited

U.S. PATENT DOCUMENTS

| 1,846,566 | 2/1932 | Mulholland | 65/350 X |
| 1,852,526 | 4/1932 | Kemp | 432/31 |
| 3,661,548 | 5/1972 | Ito et al. | 65/99 A X |

*Primary Examiner*—Arthur D. Kellogg
*Attorney, Agent, or Firm*—Karl F. Ross

[57] ABSTRACT

A method and an apparatus for the heat treatment of a float glass ribbon in which a tunnel lehr is provided with arrays of parallel heat-exchange tubes above and below the path of the ribbon and for each of the longitudinally divided zones of these arrays, the tubes are grouped and provided with respective heaters at the upstream end of the zone while all of the tubes at the zone are connected to a flow at the downstream end for drawing the heated air through the tubes. The temperature of the glass ribbon is measured at the upstream end and the throughflow of the individual groups is controlled selectively to ensure a homogeneous temperature distribution in the glass ribbon.

7 Claims, 3 Drawing Figures

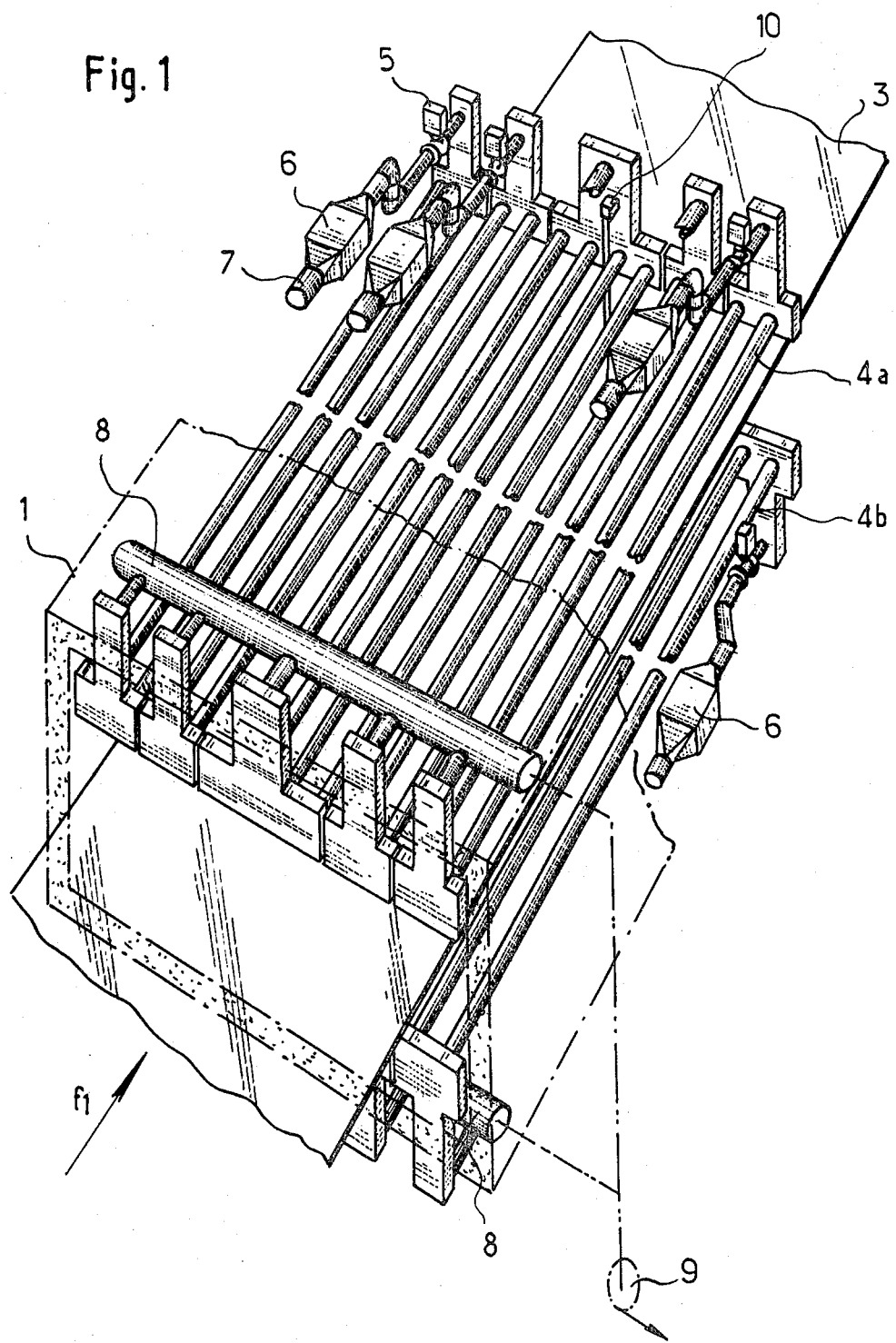

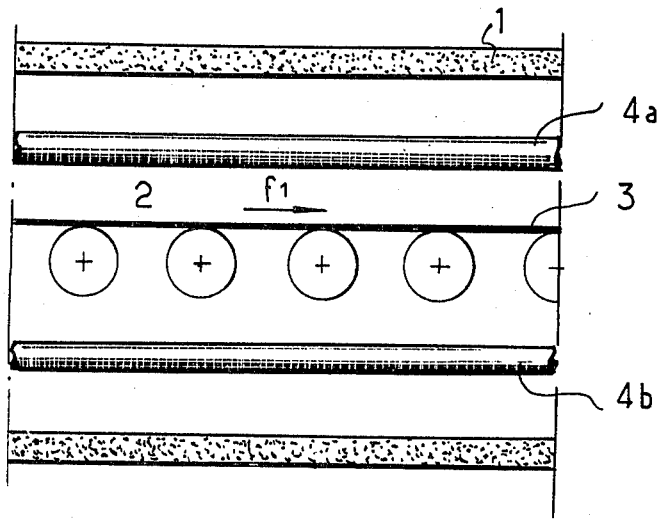
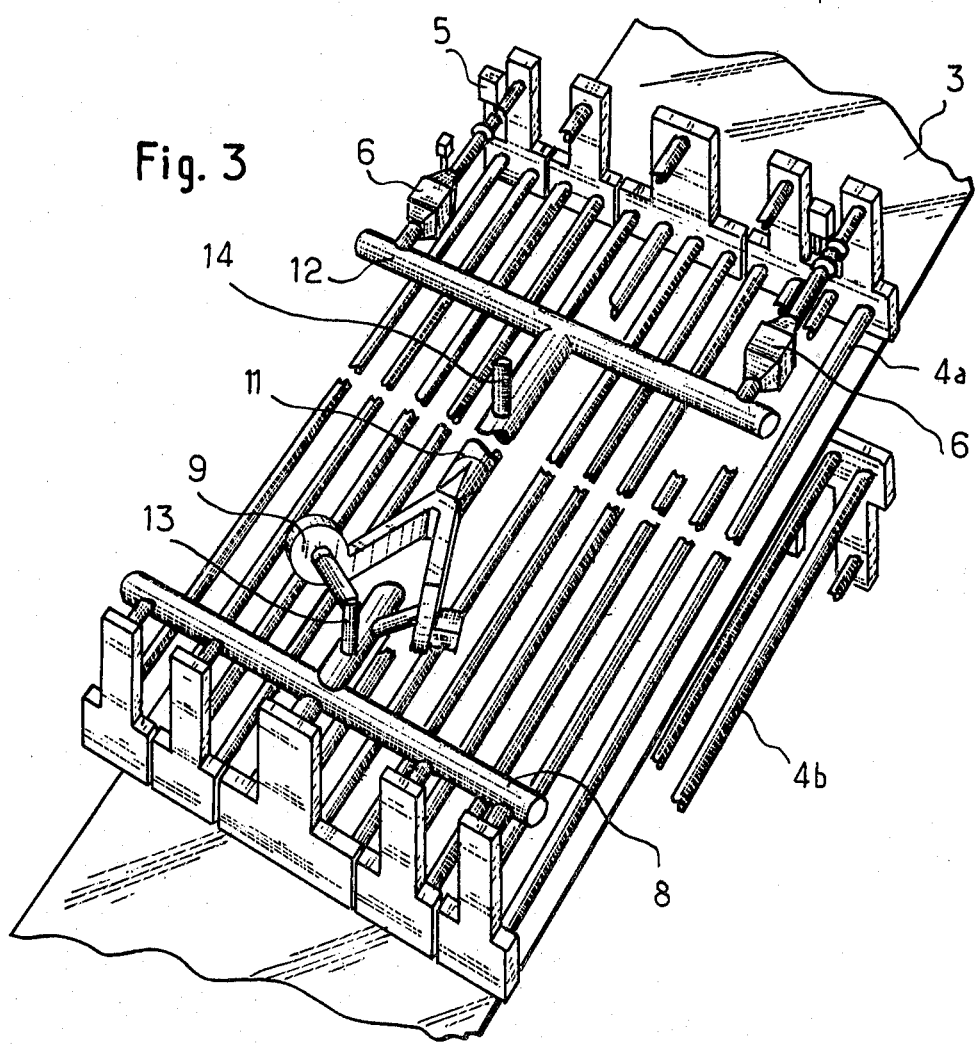

PROCESS FOR THE ADJUSTMENT OF THE GLASS TEMPERATURE IN A FLOAT GLASS LEHR AND FLOAT GLASS LEHR IN ORDER TO BRING THIS PROCESS INTO OPERATION

FIELD OF THE INVENTION

This invention relates to a process for the adjustment of the glass temperature in a float glass lehr with exchanging tubes. The invention also relates to a float glass lehr operated in accordance with this process.

BACKGROUND OF THE INVENTION

Flat glass, manufactured in a continuous way, is conveyed through a heat insulated tunnel, called a float glass lehr, which is provided with heating means and with cooling means and in which glass is cooled and annealed.

In conventional float glass lehr, the cooling means are composed of a series of exchanging tubes arranged in two horizontal rows inside the tunnel, above and below the glass ribbon. These exchanging tubes are arranged in transverse batteries around in which air flows, initially at the ambient temperature, in the opposite direction to the glass travel direction. The heating means are electrical means and consist of bare or shielded wire heaters located between the exchanging tubes and the glass. The glass cooling can be modified by acting on the air flow rate; the heating can also be modified by acting on the power emitted by the wire heaters.

This glass temperature control process has a number of serious drawbacks especially when there is a ribbon of transparent glass and/or of glass with a highly reflecting coating on one face.

As a matter of fact, glass is a poor conductor of heat and during its cooling a noticeable temperature gradient appears between the surface and the middle part of the glass ribbon. If the glass is still plastic, the stresses created by the temperature gradient produce a deformation of the glass ribbon. If the glass is sufficiently cooled and perfectly elastic the temperature gradient creates internal stresses in the glass ribbon which remain since the ribbon is no longer plastic.

Experience shows that, in order to reduce as much as possible the effect of the temperature gradient, it is advisable to achieve an even glass cooling over the whole glass lehr length, i.e. the glass temperature should decrease approx. in a linear way. Now, it should be noted that when cold air is introduced at the inlet end of the exchanging tubes, the cooling is not at all even; glass is cooled much more rapidly at the outlet than at the inlet of the lehr zone concerned so that internal stresses are induced in glass in the middle of the annealing range.

On the other hand, glass is cooled more rapidly on the longitudinal edges than in the middle part. If, in order to remedy this transverse temperature gradient, the heating means located close to the longitudinal edges of the float glass lehr are put into operation, these heating means radiate on the adjacent cooling means; owing to this interaction it is difficult to achieve an optimum and uniform temperature over the whole width of the glass ribbon.

It is very difficult to remedy these drawbacks as the cooling means have a very long response time whereas the electrical heating means have a relatively short response time and can cause glass overheating when they are brought into operation.

OBJECT OF THE INVENTION

The object of this invention is to provide a process for the adjustment of the glass temperature in a float glass lehr which remedies these drawbacks.

SUMMARY OF THE INVENTION

According to the invention, the temperature is adjusted by means of the exchanging tubes only, heated air being admitted at the inlet of these tubes.

If relatively hot air enters the tubes, it is possible to achieve a heat-up of the float glass lehr or to keep it at temperature without glass. If cooler air, at a temperature below the glass temperature, enters, it is possible to cool the glass during continuous production and to achieve an even glass cooling.

The air flowing in the tubes can circulate in an open circuit or in a closed circuit.

This invention also relates to a float glass lehr operated by this process.

According to the invention there is provided a float glass lehr the special feature of which is that it comprises means for heating the air introduced into the exchanging tubes.

These heating means can be either electrical means or burners or can consist of indirect exchangers with heat exchanging medium.

If the air which flows in the tubes circulates in a closed circuit, the float glass lehr can also include means for cooling the recirculated air. These means can, for example, consist of a cold air introduction system or of indirect exchangers with cooling fluid.

BRIEF DESCRIPTION OF THE DRAWING

In the Drawing:

FIG. 1 is a schematic perspective view of a zone of a first embodiment of float glass lehr according to the invention;

FIG. 2 is a longitudinal section through a part of this zone; and

FIG. 3 is a view similar to FIG. 1 of a second embodiment of float glass lehr according to the invention.

SPECIFIC DESCRIPTION

The first embodiment of a float glass lehr, according to the invention, shown in FIGS. 1 and 2 comprises a heat insulated tunnel 1 that is provided with rollers 2 supporting a glass ribbon 3 travelling in the direction of arrow f1.

The lehr is divided into successive zones over its length. In each zone, it comprises two horizontal rows of longitudinal exchanging tubes 4a and 4b, one arranged above and the other below the ribbon 3. Each row of mutually parallel coplanar transversely spaced tubes is divided transversely into batteries which there are five in number in the form of float glass lehr shown herein, each battery comprising a plurality of tubes.

The inlet of each battery of tubes, located at the downstream side of the zone concerned (with respect to the direction of movement of the glass ribbon) is connected to a flow control valve 5 and to heating means 6, for example with burners in which cold air is admitted in 7. The outlet of the tubes is connected to a collector 8 at the suction side of a fan 9 supplying a secondary heat recovery system.

Air thus circulates in the opposite direction to the glass travel direction.

A sensor 10 measures the glass temperature at the zone outlet side and acts by means of control systems (not shown) on the valves 5 and on the heating means 6.

By acting on the valves and on the heating means of the different batteries it is possible, for example, to heat the external edges of the sheet 3 and to cool the middle zone.

In its major principles, the form of float glass lehr shown in FIG. 3 is similar to that shown in FIGS. 1 and 2 but the air circulates in a closed circuit. The outlets of the fans 9 are connected by a pipe to a collector 12 supplying the various heating means 6. A hot air exhaust piping 14 and a cold air inlet piping 13 are connected on both sides of the fan. The air flow and the cooling capacity variation are then obtained by varying the speed of the fans 9, the cold air flow admitted through the piping 13 and the hot air flow exhausted through the piping 14. The hot air exhaust is connected to a secondary heat recovery system.

What we claim is:

1. In a method of operating a float glass lehr in which a float glass ribbon is passed on rollers through a lehr tunnel and is subjected to heating and cooling therein, and wherein arrays of tubes for heat exchange are provided above and below the glass ribbon, said tubes extending parallel to the direction of movement of the glass ribbon through the lehr, the improvement which comprises:
   (a) forming each array in sets of mutually parallel transversely spaced coplanar tubes in successive zones along said path and grouping a plurality of tubes of each array for the respective zone in groups whereby for each array and each zone a respective plurality of such groups is disposed transversely of the direction of movement of the glass ribbon through the lehr;
   (b) heating air separately for each of said groups and admitting the heated air to the tubes of each group at an upstream end of the respective zone with respect to said direction of movement of the glass ribbon through said lehr;
   (c) drawing heated air from the downstream ends of the tubes of each zone; and
   (d) measuring the temperature of the glass ribbon at the upstream end of each zone and selectively controlling the rates of flow through the respective groups of tubes in response to the measured temperature, thereby maintaining temperature homogeneity of the glass ribbon.

2. The improvement defined in claim 1 wherein the heated air is withdrawn from all of the tubes of each array in each zone in common and at least part of withdrawn heated air is recirculated to the individual groups of the respective array and zone.

3. A float glass lehr for the heat treatment of a float glass ribbon, said lehr comprising:
   an elongated lehr tunnel;
   a multiplicity of rollers spaced apart longitudinally of said tunnel but extending transversely therein and forming a path along which said ribbon is displaced on said rollers;
   a lower array of longitudinally extending, mutually parallel coplanar heat-exchange tubes disposed below said path, and an upper array of mutually parallel coplanar transversely spaced heat-exchange tubes disposed above said path within said tunnel, each of said arrays being subdivided longitudinally into respective zones, each zone having an upstream side and a downstream side with respect to the direction of travel of said ribbon along said path;
   means connecting a plurality of tubes of each array and each zone in a respective group whereby, for each zone, each of said arrays comprises a plurality of such groups in succession transversely of said direction;
   a respective air heater communicating with the tubes of each group at an upstream end of the respective zone whereby heated air flows through said tubes in a direction opposite the direction of movement of said glass ribbon along said path;
   means at the downstream end of each of said zones for drawing air from said tubes; and
   means at the upstream end of each zone for measuring the temperature of the glass ribbon and controlling selectively the heating effect contributed by each group to said glass ribbon.

4. The lehr defined in claim 3, further comprising means for recirculating heated air from the downstream end of each zone to the respective heaters of the group at the upstream end of the respective zone.

5. The lehr defined in claim 4, further comprising means for cooling the recirculated air.

6. In a method of operating a float glass lehr in which a float glass ribbon is passed on rollers through a lehr tunnel and wherein ducts for heat-exchange with the float glass ribbon are provided above and below the glass ribbon and extend parallel to the direction of movement of the glass ribbon through the lehr, the improvement which comprises:
   (a) generating hot air at a relatively downstream location along said ducts with respect to the direction of movement of the glass ribbon through the lehr;
   (b) passing said hot air through said ducts from said downstream location in a direction opposite a direction of movement of the glass ribbon through the lehr, thereby heating said ducts to a temperature below that of the glass and thereby cooling the glass ribbon; and
   (c) collecting air from said ducts at a relatively upstream location thereof with respect to the direction of movement of the glass ribbon through the layer.

7. The method defined in claim 6 further comprising recirculating hot air collected from said upstream location to said downstream location, said method further comprising the step of admitting fresh air to the recirculated air.

* * * * *